June 9, 1959
P. H. STANLEY
2,889,887
METHOD OF OPERATING ROTARY WING AIRCRAFT
INCLUDING JET-DRIVEN ROTORS
Filed Dec. 15, 1954
4 Sheets-Sheet 1
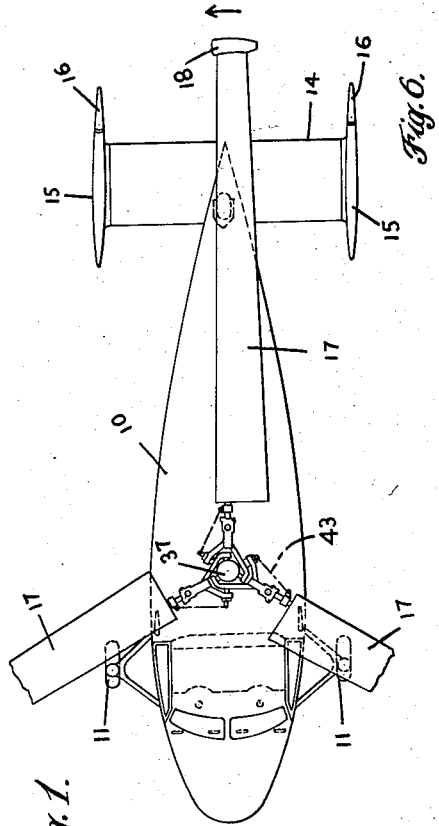
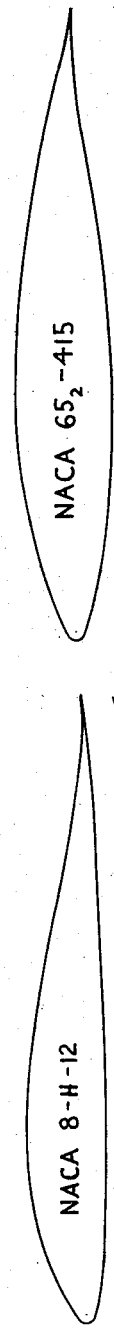
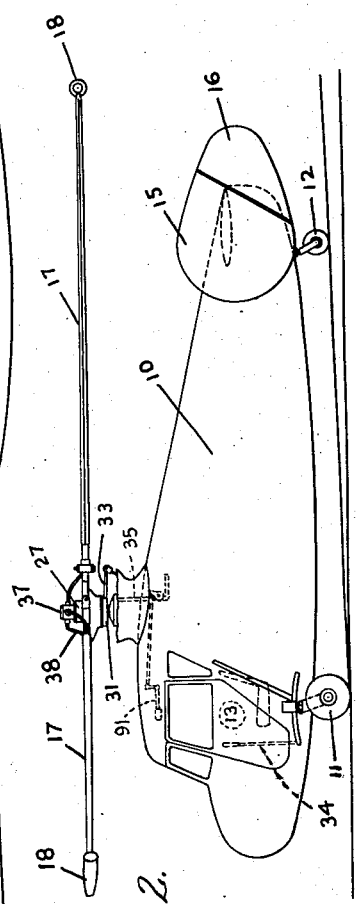
Inventor
Paul H. Stanley
Attorneys June 9, 1959  P. H. STANLEY  2,889,887
METHOD OF OPERATING ROTARY WING AIRCRAFT
INCLUDING JET-DRIVEN ROTORS
Filed Dec. 15, 1954  4 Sheets-Sheet 2

Inventor
Paul H. Stanley
By
Attorneys

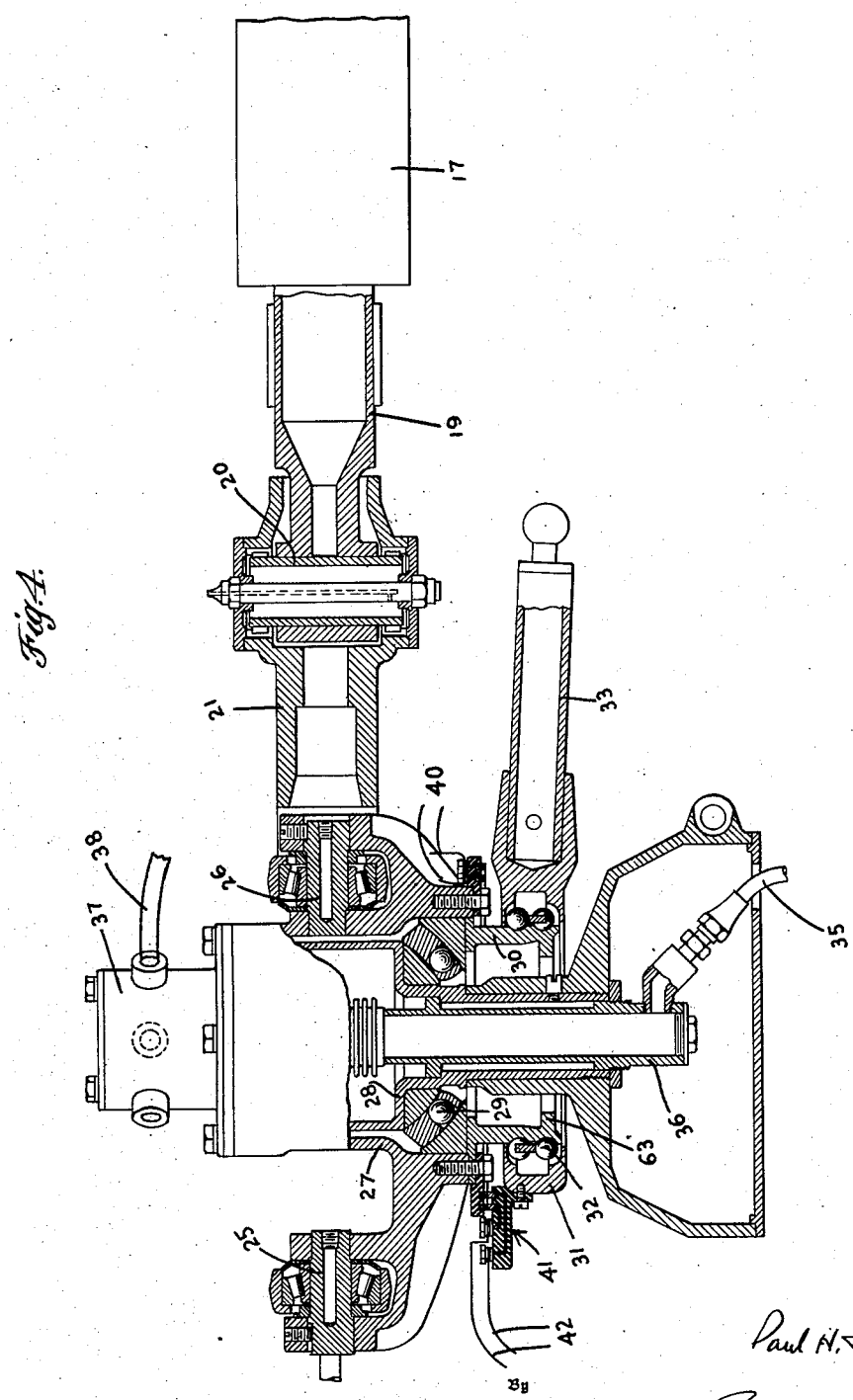

June 9, 1959  
P. H. STANLEY  
2,889,887  
METHOD OF OPERATING ROTARY WING AIRCRAFT  
INCLUDING JET-DRIVEN ROTORS  
Filed Dec. 15, 1954  
4 Sheets-Sheet 4

Inventor  
Paul H. Stanley  
By  
Attorney

United States Patent Office 2,889,887
Patented June 9, 1959

2,889,887
METHOD OF OPERATING ROTARY WING AIRCRAFT INCLUDING JET-DRIVEN ROTORS

Paul H. Stanley, Glenside, Pa., assignor to Autogiro Company of America, a corporation of Delaware Application December 15, 1954, Serial No. 475,624

2 Claims. (Cl. 170—135.4)

This invention relates to rotor-equipped aircraft including jet-driven rotors and methods of operation, and is especially concerned with a helicopter or similar aircraft having one or more bladed rotors adapted under at least one translational flight condition to contribute both lift and propulsive thrust; and this application is a continuation-in-part of my prior copending (parent) application No. 36,938 filed July 3, 1948, now abandoned.

Stated generally and broadly, the object of the invention is to improve the efficiency and the operating characteristics of bladed aircraft rotors adapted for use on aircraft such as helicopters and the like and thus to improve also the efficiency and operation of the aircraft.

In considering various of the improvements effected by the invention, reference is first made to certain features of a conventional hub driven helicopter rotor, for example, a bladed rotor hub driven at a blade tip speed of the order of about 450 feet per second. A typical prior rotor system of this type incorporates flapping pivots for the blades and also mechanism for cyclically varying the rotor blade pitch angle for purposes of maneuvering, as well as for the purpose of deriving a horizontal or propulsive thrust component, so as to induce translation flight of the aircraft.

In a prior art hub driven rotor of the character referred to, variations in conditions of operation, such as changes in translational flight speed and adjustments of the cyclic pitch control system to effect maneuvers, require that the rotor blades operate, at different times, over a range of effective aerodynamic angles of attack extending from about 0° or slightly below up to about 20°. While it has been recognized that it is desirable to employ a blade section having a relatively low drag coefficient, nevertheless, because of the broad range of effective aerodynamic angles of attack over which the blade must operate under different conditions, it has been necessary to select a blade section with which the drag coefficient did not vary too abruptly or rapidly at any points throughout the range of variation of aerodynamic angle of attack encountered. It was further of especial importance that the drag coefficient of the blade section did not increase excessively toward the upper end of the range of aerodynamic angles of attack encountered.

For the foregoing and other reasons, in the typical prior hub driven helicoper rotor it has not been practicable to employ certain of those blade sections which are commonly referred to as "laminar flow" sections. These laminar flow sections are characterized by exceptionally low drag coefficient over a relatively small range of aerodynamic angles of attack, but they are also characterized by abrupt increases in the drag coefficient beyond the limits of said relatively small range, and by an exceedingly sharp increase in the drag coefficient at relatively high angles of attack toward the upper end of the range encountered in the typical hub driven helicopter rotor referred to.

With the foregoing in mind, the present invention contemplates employment of two or more of the following features in combination: jet drive of the rotor, rotor blades of laminar flow section, high blade tip speed, and low overall range of aerodynamic angle of attack of the blades. By properly utilizing suitable constructional and operational combinations of these major features that they mutually contribute to a substantial increase in overall efficiency.

In a typical rotor constructed and operating according to the invention, the laminar flow blades are driven by the jet drive system at a considerable higher blade tip speed than is efficient or practicable with the prior hub driven type of helicopter rotor referred to, preferably at a blade tip speed of the order of from 700 to 750 feet per second.

By the combined use of the laminar flow blade section and of the jet drive, several striking improvements are attainable. First, the total range of effective aerodynamic angles of attack encountered is reduced to only a minor fraction of that encountered in the typical hub driven helicopter rotor above referred to. This range, indeed, may be brought within the range of angles of attack of the laminar flow blade section within which the very low drag coefficient is retained. Second, the reduction in drag effected in this manner is of such magnitude that the jet drive system may much more readily drive the rotor at the high tip speed contemplated. The above two effects are mutually interdependent, and at the same time mutually intercontributing—so that it may be said that the combination results in a synergistic effect.

Another advantage of the arrangement of the present invention lies in the fact that the total variation of the drag coefficient of the laminar flow blade throughout the entire range of angles of attack encountered when the rotor is jet driven at the high tip speed referred to is very small; which is in distinct contrast with the variation of drag coefficient encountered throughout the broad range of angles of attack encountered in the prior hub driven helicopter rotor referred to. In this way the invention provides for substantial reduction in the variations of drag moments encountered by the blades under different conditions of operation or when maneuvering. This still further increases the efficiency and effects an appreciable reduction in vibration, bending and oscillation of the blades.

In considering still another feature of the invention, attention is again directed to the fact that the laminar flow type of blade section contemplated for use herein is quite critical with respect to angle of attack, the drag coefficient rapidly rising at both ends of the limited range of angles within which low drag operation occurs. Still further, the said very limited range of angles of attack can only be fully utilized if all or most of it can be made to lie above the value of 0°, and in order to secure this advanage the invention contemplates employing the unsymmetrical laminar flow airfoils which I have found adaptable for that purpose—two typical examples of which are illustrated herein. With these characteristics in mind, the invention contemplates provision of stop devices associated with the rotor control system and so located as to provide against adjustment of the controls to a position in which an aerodynamic angle of attack would be encountered beyond said limited range of low drag, and more specifically the invention contemplates that particular relationship between the control limits or stops, the unsymmetrical laminar flow blade section, and the mean setting of said section on the rotor hub which will result in having most, and preferably all, of the operating range of aerodynamic angles of attack disposed at the plus side of the 0° point, and will further result in having the blades operate within the said limited range (so located) substantially throughout the normal flight speed range of the aircraft, and preferably throughout the operating range of the aircraft from hovering flight to normal top-speed forward flight.

Since the desirable blade tip speed for so utilizing the particular laminar flow sections contemplated lies between about 680 feet per second and 760 feet per second—with the optimum between about 700 and 750 feet per second—the invention contemplates such construction, operation, location and control of the jet driving devices for the rotor that blade tip speeds within the desired (and preferably within the said optimum) range may be obtained, and preferably maintained throughout normal flight operations; and to this end the invention contemplates controllable jet devices of any of several suitable types, and, for greatest efficiency, jet devices of a continuous-operation type constructed and located to operate most efficiently at speeds above the characteristic hub-driven rotor speeds heretofore referred to, and most desirably which operate with reasonably good or high efficiency when so located or mounted on the rotor that the rotor is being driven at tip speeds of the order hereinabove mentioned.

How the foregoing and other objects and advantages are attained is further explained with reference to the accompanying drawings, in which—

Figure 1 is an outline plan view of an aircraft equipped and operating according to the present invention;

Figure 2 is an outline elevational view of the aircraft of Figure 1;

Figure 4 is a vertical sectional view of the hub shown in Figure 3, with certain parts shown in elevation;

Figures 5 and 6 are views illustrating two blade sections suitable for use according to the present invention;

Figure 3:
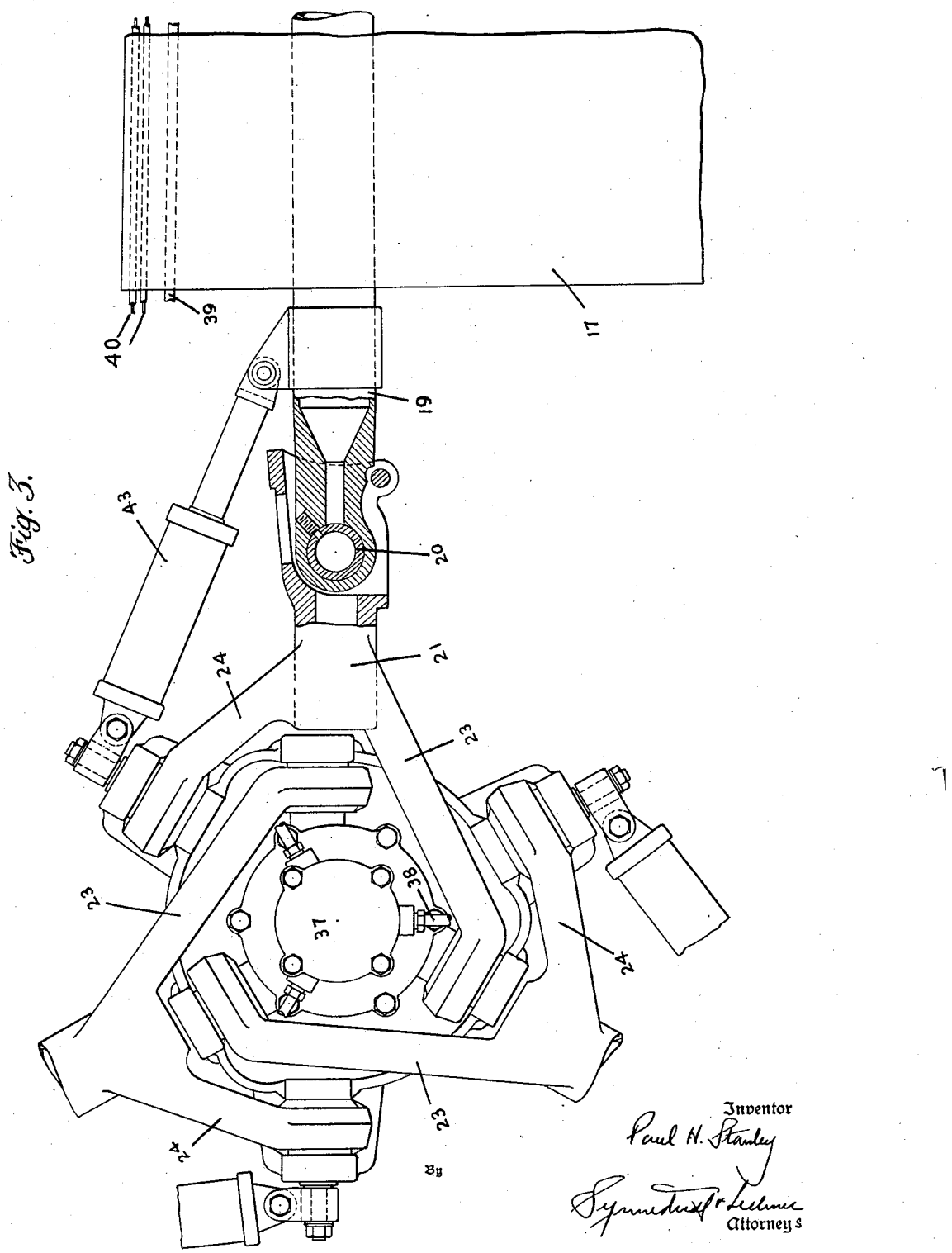
Figure 3 is an enlarged plan view of the rotor hub of the aircraft shown in Figures 1 and 2, with a portion of one blade also shown, and with certain parts shown in horizontal section.

Referring first to Figures 1 and 2, the illustrative aircraft there shown comprises a body 10 having any desired form of landing gear, such as wheels 11 and 12. A pilot's station is indicated at 13, and empennage surfaces may be employed such as shown at 14 and 15. Controllable rudders 16 may also be utilized. Although any number of rotors and of rotor blades may be used, the aircraft illustrated is equipped with a single three-bladed rotor, the blades of which are shown at 17. The rotor is adapted to be driven by a jet drive system, for which purpose each of the blades of the illustrative aircraft carries a jet drive device 18 at the blade tip. The particular type of jet drive system employed is not of importance to the present invention, excepting that the construction, operation, location and control thereof must be in conformity with the requirements hereinabove set forth. Thus, any of a variety of systems are usable so long as their efficient operating speed ranges, at the chosen location of the jet devices on the rotor, do not lie appreciably below those required for the rotor tip speed range herein contemplated. Certain appropriate systems, of a continuous (as contrasted with intermittent pulse) type, are disclosed in Pitcairn Patent No. 1,820,946, and in my copending application, Serial No. 255,030, filed November 6, 1951, now abandoned, as a division of my prior application, Serial No. 650,213, filed February 26, 1946, which issued as Patent 2,601,465 on June 24, 1952, during the pendency of my parent application 36,938, filed July 3, 1948; and in the present case I disclose a suitable system of the ram-jet type, utilizing a control lever or throttle similar to that employed in my said two applications—the jet devices in each of these instances being located at the blade tip and being constructed to operate with a reasonable degree of efficiency in that location at a speed lying within the blade tip speed range contemplated by this invention, and being controllable by said throttle to drive the rotor at such speed, and to maintain a range of rotor operating speeds within such desired speed range, throughout the entire aircraft operating range, from hovering flight to normal top-speed forward flight, provided that the rotational drag of the rotor is minimized by the utilization of laminar flow aerfoils of the characteristics herein disclosed (at least within the outer one-fourth or one-third of the blade length).

In the rotor shown in Figures 1 and 2, the individual blades are connected with a rotative hub in the manner more fully illustrated in Figures 3 and 4, to which reference is now made. The blade has a shank 19 at its root end which is connected by means of a drag pivot 20 with a forked blade mounting member 21. The inner ends of each of the pairs of forked prongs 23—24 are pivoted as indicated at 25—26 on the rotative hub member 27. The rotative hub member is in turn mounted for rotation and for tilting movement on the nonrotative hub member 28 by means of spherical bearing surfaces having interposed bearing balls such as indicated at 29, this type of hub mounting being fully disclosed in U.S. patent of Agnew E. Larsen, No. 2,264,942, issued December 2, 1941.

The rotative hub member 27 has a downwardly extending skirt 30 on which a control ring 31 is journaled by means of bearings 32. Control arms, such as shown at 33 project from the control ring and are adapted to be connected by appropriate linkage with the control stick indicated at 34 in Figure 2. This control system provides for tilting of the rotative hub member 27 in all directions and serves to set up control moments by which the aircraft may be maneuvered.

Operating fuel for the jet devices 18 may be delivered thereto in any desired manner, for instance through a supply connection 35 communicating with a tube 36 extending vertically upward through the rotor hub. The tube 36 may be provided with appropriate flexible connections of the type disclosed in my copending application and my patent above referred to and this tube serves to deliver fuel to the chamber 37 at the top of the hub. Flexible tubes 38 are connected with the chamber 37 and extend to the inner ends of the blades, where such tubes are coupled with pipes such as indicated at 39 in Figure 3 which extend outwardly through the blades to the jet devices 18. An ignition system for the fuel in the jets may also be provided, including electrical connections 40 extended through the blades and associated with a slip ring mechanism generally indicated at 41 in Figure 4, through which the connections 40 are coupled with other connections 42 extended to a suitable source of ignition current and controls in the body of the aircraft. The jet drive controls include the throttle or control lever 91 seen in Figure 2 (like that shown in my said pending application and my issued patent) for regulating one or more of the fuel feed pipes or tubes referred to, whereby the rotor speed may be controlled within the limits contemplated by this invention.

Referring to Figures 1 and 3, blade damper devices 43 may be associated with the blades to damp movement thereof about the drag pivots 20.

Figure 8:
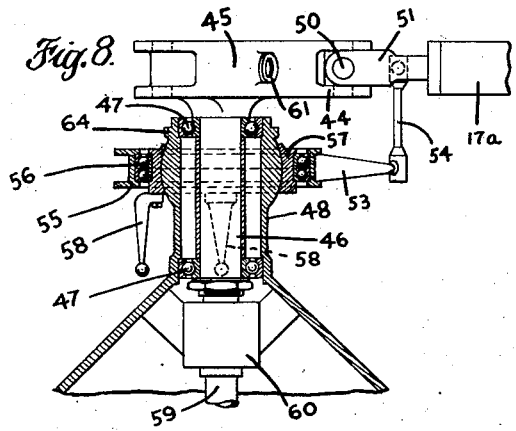
Figure 8 is a side view of a modified form of rotor hub, with certain parts shown in vertical section and others in elevation.
Figure 9:
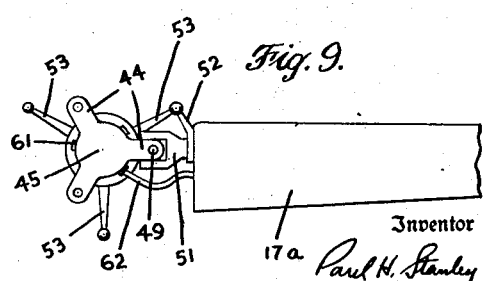
Figure 9 is a plan view of the arrangement shown in Figure 8.

Another form of rotor hub, blade mounting and flight control which may be utilized according to the invention is illustrated in Figures 8 and 9. This arrangement is also shown as incorporated in a three-bladed rotor, although it will be understood that here again any desired number of blades may be used. Each blade 17a in the arrangement of Figures 8 and 9 has its root end connected with a lug 44 projecting from the rotative hub 45. The hub 45 has a downwardly projecting spindle 46 which is journaled as by bearings 47 within a hub support 48. The connection between the blade root and the hub lug 44 for each blade preferably includes a drag pivot 49 and a flapping pivot 50, the axes of these two pivots in this arrangement intersecting each other in the manner of a universal joint. In addition to the flapping and drag pivots, each blade 17a is journaled on the root end mounting member 51 with freedom for pitch change movement substantially about the longitudinal axis of the blade. This pitch change movement may be controlled by means of an arm 52 projecting from the blade at its inner end, the arm 52 being coupled with an arm 53 by means of a link 54 desirably universally connected to the arms at its upper and lower ends. Arm 53 extends from the rotative swash ring 55 which is mounted by bearings 56 upon a universally tiltable non-rotative swash member 57, the latter being carried by a spherical surface formed on the rotor support 48. Control arms 58 may be connected by linkage with the pilot's control stick, so that this pitch control system enables controlled cyclic variation of blade pitch in a manner to set up moments adapted to maneuver the aircraft.

Fuel for operating the jet devices employed in the arrangement of Figures 8 and 9 may be delivered from a supply pipe 59 through a rotative connection 60 to a passage extending vertically through the hub spindle 46. Ports 61 formed in the hub member 45 and communicating with the fuel supply passage serve to deliver fuel to the flexible connections 62 which extend to the blades. A throttle such as 91 in Figure 2 may serve to control these jet devices in the manner hereinbefore described.

Figure 7:
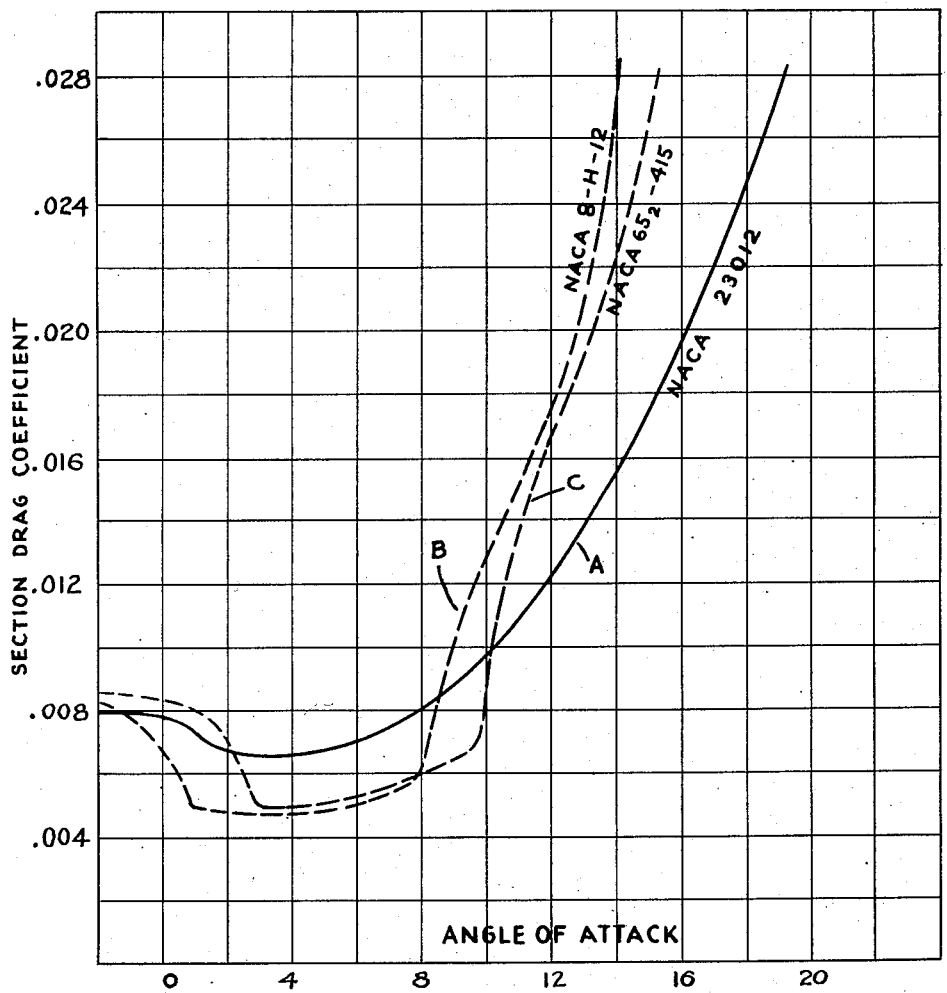
Figure 7 is a graph showing certain blade section characteristics.

As hereinabove mentioned, it is contemplated according to the invention to employ a blade having a laminar flow airfoil section. It is here pointed out more specifically that the invention contemplates employment of a blade section of which the calculated sectional drag coefficient lies below .006 at those effective aerodynamic angles of attack encountered as a result of compensation for differential airflow on the advancing and retreating sides of the rotor during translational flight, such drag coefficient preferably being retained throughout a range of angles of attack comprehending those angles encountered under all conditions of operation, including extremes of control manipulations. There are known a number of specific blade sections which answers these requirements, two such blade sections being illustrated in Figures 5 and 6, wherein the indicated designation of the airfoil section is that of the National Advisory Committee for Aeronautics; and it will be seen that these blades sections are unsymmetrical, for reasons earlier mentioned and which will be referred to again hereinafter. In the graph of Figure 7 certain characteristics of these two blade sections have been plotted along with corresponding characteristics of a typical blade section currently widely used for the blades of a hub driven helicopter rotor.

In analyzing the data graphed in Figure 7 it is first noted that the vertical axis is graduated in units of section drag coefficient, the horizontal axis being graduated in degrees of aerodynamic angle of attack, i.e., the effective angle of the airflow encountered by the blade. Thus, this "aerodynamic angle of attack" is to be distinguished from the pitch setting of the blade, which latter is ordinarily measured relative to a no-lift setting relative to a plane perpendicular to the axis of rotation of the blade. The aerodynamic angle of attack differs from the pitch setting of the blade under most conditions of operation, because of other factors which influence the angle of movement of the blade through the air, and in general the mean aerodynamic angle of attack is considerably lower than the mean pitch setting, at least in power-driven operation. Some of such other factors include the relative direction and speed of motion of the air and the aircraft, the flapping motion of the blade, and also the effect of the differential air speed on the advancing and retreating sides of the rotor during translational flight.

It is further to be understood with reference to Figure 7 that the data represented therein relates only to the sectional or profile drag coefficient and not to induced drag. The sectional drag, in a typical instance, may comprise about 30% of the total drag. It is still further to be noted that the values shown in Figure 7 are given for highly accurate airfoil sections tested in the wind tunnel, in view of which the calculated drag coefficients indicated are somewhat lower than would usually be obtained in full-scale with normal blade construction. Notwithstanding this, the graph gives a true basis of comparison between the characteristics of different blade sections.

Referring first to the curve identified by the letter A in Figure 7, which is a curve of the typical blade section employed in a hub driven helicopter rotor (N.A.C.A. No. 23012), it will be noted that with substantial increase in angle of attack the sectional drag coefficient gradually rises from its minimum at an angle of attack of about 3.75°, the acceleration or rate of increase of drag being fairly uniform. The minimum drag coefficient of this section, however, lies at about .0066. This general type of blade section is advantageously employed in the typical hub driven helicopter rotor for a number of reasons including the fact that at the blade tip speeds at which it is practicable or efficient to drive a hub driven helicopter rotor the mean blade pitch setting on the hub must be relatively high, for instance of the order of 12° and further because of the fact that at the practicable or efficient blade tip speeds of the hub driven helicopter rotor a relatively wide range of angles of attack are encountered under various conditions of operation, especially when taking into account changes in angle of attack occurring during compensation for differential airflow at opposite sides of the rotor and the further broadening of this range which is encountered because of the requirement of retaining a reasonable quantum of control even at maximum translational flight speed. It may be mentioned again that in typical hub driven helicopter rotors the overall range of variation in angle of attack encountered may extend from about 0° up to about 20°. With these factors in mind, it is of importance that the blade section for a hub driven helicopter rotor be one in which the drag coefficient does not change abruptly with variation in angle of attack, even toward the extremes of the range encountered.

For the foregoing reasons the advantages of the so-called low drag or laminar flow blade sections are not obtainable in the well-known hub driven types of rotor without encountering certain marked disadvantages, particularly with relation to variation of drag moments on the blades. As will readily be seen from curves B and C of the graph, blade sections of very low calculated mean sectional drag are also characterized by abrupt changes in the drag coefficient at certain critical angles of attack, and further by a very much steeper increase in drag coefficient at high angles of attack than is the case with a blade of the type represented by curve A.

However, notwithstanding the fact that the laminar flow type of blade is unsuited to the typical hub driven helicopter rotor, according to the present invention provision is made for highly effective use of such blade sections in a helicopter rotor, by combining such use with a jet drive system, especially where the drive system is arranged to drive the rotor at a blade tip speed of the order of 700 to 750 feet per second (although this speed range may be widened somewhat, for example, to about 680 feet per second on the lower end of the range, as by some modification of the unsymmetrical airfoil chosen, or by limiting the use of the laminar flow section to say the outer half or one-third or one-quarter of the blade span, and for example, up to about 760 feet per second on the upper side of the range, by modification of blade profile, or to still higher tip speeds if the maximum flight speed of the craft be kept down within reasonable limits, so that the advancing blade at maximum flight speed does not have an overall air speed markedly exceeding the highest efficient operating speed). By the use of such laminar flow blade sections the sectional drag may be reduced as much as 25 or 30%, or even more, which represents a reduction in the neighborhood of 10% in the total drag, and this reduction in drag is an important factor in making practicable the drive of the rotor by a jet system, so that relatively high blade tip speeds may be attained. Such high blade tip speed in its turn is of great importance since this results in high jet efficiency and in a very extensive reduction in the total range of aerodynamic angles of attack which the blade encounters over the full range of operating conditions. The high blade tip speed also enables initial setting of the blades on the hub at a lower mean pitch setting than is practicable in the case of the hub driven helicopter rotor, an effective range according to the present invention being from about 4.5° to about 6° measured from the sectional no-lift setting relative to a plane perpendicular to the axis of rotation, with the blade positioned at its mean flight coning angle (as compared with the typical 12° mean pitch setting heretofore mentioned as characteristic of prior hub driven rotors). This reduced mean pitch setting is so located that the resulting somewhat lower mean aerodynamic angle of attack lies roughly in the mid region of the range of aerodynamic angles of attack through which the laminar flow blade sections retain their low drag characteristics.

Because of the variation in aerodynamic angle of attack accompanying compensation for differential airflow in translational flight, and further because of the variations in aerodynamic angle of attack which accompany adjustments of the rotor hub, or of the individual blades for purposes of maneuvering, the blade section to be employed in the rotor of the present invention should be one in which the low drag characteristic (preferably a calculated sectional drag coefficient below .006) is retained throughout a range of angles of attack of at least 4°, and preferably of the order of 6° or 8°. There are a number of blade sections responding to these requirements, in which the sectional drag coefficient lies between about .004 and .006 throughout the range of angles of attack referred to.

In view of the shape of curves B and C in Figure 7, especially the steep walled valleys, or "buckets," defining the range of angles of attack where low drag is retained, the invention contemplates provision of stop devices associated with the control system in a manner to restrict control adjustments to a range in which the angle of attack of the blade will not pass the relatively critical angles (represented by the junctions between the side walls and the bottom wall of the valley of the curve above referred to). In considering the stop devices just mentioned it is here pointed out that the operation of both of the control systems herein illustrated (the hub tilting system in the embodiment of Figures 1 to 4 inclusive, and the cyclic pitch control system of the embodiment of Figures 8 and 9) is accompanied by change of aerodynamic angle of attack of the blades. With this in mind, and referring first to the embodiment of Figures 1 to 4 inclusive, it will be seen that excessively large tilting movement of the hub would bring about changes in effective aerodynamic angle of attack of the blades going beyond the desired range. As shown in Figure 4, therefore, the invention contemplates employment of a stop ring such as indicated at 63 within the skirt 30, positioned to abut the central rotor support. This stop preferably has such clearance as to permit only that degree of tilting movement which will result in variation of aerodynamic angle of attack within the desired limited range. Similarly, in Figure 8 a stop ring 64 is provided for restricting the maximum tilting movement of the swash ring 57, the clearance here provided being similar to that referred to just above.

In a typical case according to the invention, and with a positive mean blade pitch setting at the range of 4.5° to 6°, the stop clearance should be sufficient to provide control adjustment of from 2° to 4° in either direction from the mean setting. With a jet system driving the rotor at a tip speed of the order of 700 to 750 feet per second, the range indicated provides adequate leeway for control maneuvers even at maximum translational flight speed, without exceeding the desired maximum variation of angle of attack.

In order that the "bucket" of the curve of the laminar flow section should be located or centered at the desired point for full utilization in the exceptionally narrow range of angles of attack contemplated by this invention, it is important that the laminar flow sections be of the unsymmetrical types illustrated, or of related families of unsymmetrical character. Otherwise the "bucket" of the curve may be centered too close to, or even athwart of, the 0° position in the range of angles of attack. It may thus be seen that the full practical usefulness of the present invention cannot be attained by employing any and every laminar flow blade section, but that it is necessary for this purpose to use the unsymmetrical laminar flow sections generally conforming with the requirements herein set forth, and typified by Figures 5, 6 and 7.

Still another feature of importance is the provision of a blade mounting means providing for automatic variation of blade pitch with flapping movement of the blade. In the embodiment of Figures 1 to 4 inclusive, this automatic blade pitch change is effected by the employment of an oblique flapping pivot 25—26, the axis of which when viewed in plan makes an acute angle with the longitudinal axis of the blade at the leading side of the blade axis. This obliquity of the flapping pivot axis results in decrease in blade pitch when the blade flaps upwardly and increase of blade pitch when the blade flaps downwardly. This automatic pitch change further contributes toward retaining the blade pitch angle within the desired narrow range of angles of attack. It is further of advantage for other reasons pointed out in my copending application above referred to, including the fact that an independent control of the mean blade pitch angle is not required for the purpose of converting operation of the helicopter from powered operation to autorotational operation. In the event of power failure, the reduction in r.p.m. of the rotor will result in operation of the rotor at higher coning angle with consequent reduction of blade pitch, to thereby ensure effective autorotational actuation thereof.

A similar effect is attainable with the embodiment of Figures 8 and 9, wherein the pitch control linkage 52, 53 and 54 is so arranged that upward flapping movement of the blade will result in decrease of blade pitch.

While it is thus seen that a collective pitch control may not be needed in practicing the present invention, I contemplate that it may be used if desired, provided that the limitations on the extent of its operation, together with the limitations on the extent of the cyclic pitch control operation (if such be also used), shall be sufficiently close or narrow that the total range of variation of aerodynamic cycle of attack (from all causes) does not exceed that heretofore taught as permissible within the scope of the present invention.

It should be understood that the laminar flow blade section need not necessarily be utilized throughout the entire length of the blades, although according to the invention it is preferable to employ such blade sections at least in the outboard half of each blade, i.e., the region in which the blade is most efficient from the standpoint of contributing thrust, except in special circumstances as hereinabove suggested.

I claim:
1. The method of operating a rotor-equipped aircraft having rotor-blade elements of laminar-flow section with a narrow low-drag bucket characteristic as herein defined, which method comprises driving the rotor at a blade tip speed of between about 680 feet per second and 760 feet per second, controlling said craft by controlling the rotor blade path relative thereto, and limiting the range of variation of rotor blade aerodynamic angle of attack resulting from such control, to such an extent that the overall variations of aerodynamic angle of attack from all causes is kept substantially within the bucket range of the said rotor blade section.

2. The method of claim 1 including the driving of the rotor by jet devices and regulating said speed by controlling the thrust produced by said devices.

References Cited in the file of this patent
UNITED STATES PATENTS

| | | |
|---|---|---|
| 2,264,942 | Larsen | Dec. 2, 1941 |
| 2,408,788 | Ludington | Oct. 8, 1946 |
| 2,429,646 | Pullin | Oct. 28, 1947 |
| 2,485,502 | McCollum | Oct. 18, 1949 |

FOREIGN PATENTS

| | | |
|---|---|---|
| 810,307 | France | Dec. 28, 1936 |

OTHER REFERENCES

"Aviation Week," issue of September 22, 1947, pp. 28–31.

UNITED STATES PATENT OFFICE

CERTIFICATE OF CORRECTION

Patent No. 2,889,887            June 9, 1959

Paul H. Stanley

It is hereby certified that error appears in the printed specification of the above numbered patent requiring correction and that the said Letters Patent should read as corrected below.

Column 1, line 38, for "translation" read -- translational --; column 2, line 7, strike out "that"; line 55, for "advanage" read -- advantage --; column 5, line 50, for "Advistory" read -- Advisory --.

Signed and sealed this 17th day of November 1959.

(SEAL)
Attest:

KARL H. AXLINE
Attesting Officer

ROBERT C. WATSON
Commissioner of Patents